(12) United States Patent
Chen

(10) Patent No.: US 8,755,661 B2
(45) Date of Patent: Jun. 17, 2014

(54) ELECTROMAGNETIC WAVE PROPAGATING STRUCTURE

(75) Inventor: Kuan-Ren Chen, Tainan (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 13/405,589

(22) Filed: Feb. 27, 2012

(65) Prior Publication Data

US 2012/0212831 A1   Aug. 23, 2012

Related U.S. Application Data

(62) Division of application No. 12/053,896, filed on Mar. 24, 2008, now Pat. No. 8,126,305.

(30) Foreign Application Priority Data

Jun. 6, 2007   (TW) ................. 96120414 A
Jan. 30, 2008   (TW) ................. 97103559 A

(51) Int. Cl.
*G02B 6/10*   (2006.01)
*G02B 27/30*   (2006.01)

(52) U.S. Cl.
USPC .......................................... 385/129; 359/641

(58) Field of Classification Search
USPC .......................................... 385/129; 359/641
See application file for complete search history.

(56) References Cited

U.S. PATENT DOCUMENTS

2005/0161589 A1*   7/2005   Kim et al. ................. 250/216

\* cited by examiner

*Primary Examiner* — Jerry Blevins
(74) *Attorney, Agent, or Firm* — Foley & Lardner LLP; Stephen A. Bent

(57) ABSTRACT

An electromagnetic wave propagating structure includes a main body having surfaces capable of blocking propagation of an electromagnetic wave, and including an incident side and an exit side opposite to the incident side in a wave-propagating direction. The main body is formed with two wave-propagating channels that are spaced apart from each other by a distance not greater than the wavelength of the electromagnetic wave. Each of the wave-propagating channels extends from the incident side to the exit side, and has an inner dimension not greater than half of the wavelength of the electromagnetic wave. The electromagnetic wave propagating structure is adapted to allow an electromagnetic wave to propagate therethrough via the wave-propagating channels for focusing into a light spot having a spot size that is smaller than half of the wavelength of the electromagnetic wave.

3 Claims, 18 Drawing Sheets

ELECTROMAGNETIC WAVE PROPAGATING STRUCTURE

CROSS-REFERENCE TO RELATED APPLICATION APPLICATIONS

The subject application is a divisional application of U.S. Ser. No. 12/053,896 filed Mar. 24, 2008; which claims priority to Taiwan Application No. 096120414 and Taiwan Application No. 097103559, filed respectively on Jun. 7, 2007 and Jan. 30, 2008. The subject matter of each of these applications are incorporated herein by reference in entirety.

BACKGROUND OF THE INVENTION

1. Field of the Invention

The invention relates to an electromagnetic wave propagating structure, more particularly to an electromagnetic wave propagating structure that surpasses diffraction limit and that enhances resolution and precision of optical systems which incorporate the electromagnetic wave propagating structure.

2. Description of the Related Art

Electromagnetic wave technology, especially optical technology, is one of the most widely used basic technologies in high-technological industries such as medical examination, precision measurement, semiconductor industry, etc. Therefore, the search for ways to enhance the resolution and precision of optical technology is what both the academic and industrial communities are striving for.

The behavior of light is limited by the diffraction limit, which restricts the minimum value of the product of angular divergence (sine of diffraction angle ($\sin \theta$)) and a width of light beam ($2w$). At present, the achievable highest resolution for a focused light spot in optical systems is approximately 0.61 times the wavelength of the incident light beam (half of the wavelength in 1-D). By surpassing the diffraction limit, light can be focused into a light spot having a size far below the wavelength of the light, thereby enhancing the resolution and precision of optical systems.

Currently, there exist three methods for enhancing optical resolution, which include reducing the wavelength of the light beam, increasing the refraction index of an optical medium through which the light beam propagates, and adopting an optical lens utilizing the half-angle of the maximum cone of light. Out of these three methods, the method involving reducing the wavelength of the light beam produces the most remarkable effects, and is thus the most widely used method. For example, in photoetching and lithography processes during semiconductor manufacturing, the wavelength of the light beam used for exposure and development is reduced to within the wavelength range of ultraviolet light. However, the problems with this method reside in the increasing difficulties encountered in further reducing the wavelength and the corresponding manufacturing techniques and the increasing costs required for building corresponding facilities, which eventually become a bottleneck for the advancement of related fields.

Therefore, how to surpass the diffraction limit that restricts various optical applications in order to enhance the resolution and precision of optical systems is a challenge to be dealt with.

SUMMARY OF THE INVENTION

Therefore, an object of the present invention is to provide an electromagnetic wave propagating structure that is capable of enhancing resolution and precision in optical systems.

According to one aspect of the present invention, there is provided an electromagnetic wave propagating structure adapted for use in an electromagnetic wave propagating system. The electromagnetic wave propagating system includes a wave emanating block, from which an electromagnetic wave having a wavelength is adapted to propagate in a wave-propagating direction, and a wave receiving block. The electromagnetic wave propagating structure includes a main body that has surfaces capable of blocking propagation of the electromagnetic wave, and that includes an incident side and an exit side opposite to the incident side in the wave-propagating direction. The main body is formed with two wave-propagating channels that are spaced apart from each other by a distance not greater than the wavelength of the electromagnetic wave. Each of the wave-propagating channels extends from the incident side to the exit side and has an inner dimension not greater than half of the wavelength of the electromagnetic wave. The electromagnetic wave propagating structure is adapted to allow an electromagnetic wave to propagate from the wave emanating block therethrough via the wave-propagating channels toward the wave receiving block for focusing into a light spot having a spot size that is smaller than half of the wavelength of the electromagnetic wave.

Another object of the present invention is to provide an electromagnetic wave propagating structure suitable for producing a super collimated beam.

According to another aspect of the present invention, there is provided an electromagnetic wave propagating structure adapted for use in an electromagnetic wave propagating system. The electromagnetic wave propagating system includes a wave emanating block, from which an electromagnetic wave having a wavelength is adapted to propagate in a wave-propagating direction. The electromagnetic wave propagating structure includes a main body that has surfaces capable of blocking propagation of the electromagnetic wave, and that includes an incident side and an exit side opposite to the incident side in a wave-propagating direction. The main body is formed with two wave-propagating channels that are spaced apart from each other by a distance not greater than the wavelength of the electromagnetic wave. Each of the wave-propagating channels extends from the incident side to the exit side and has an inner dimension not greater than half of the wavelength of the electromagnetic wave. The main body defines a central axis in the wave-propagating direction. Each of the wave-propagating channels has an incident opening at the incident side of the main body, an exit opening at the exit side of the main body, and an inner portion that extends between the incident and exit openings, that defines a central line parallel to the central axis and that has an inner dimension not greater than that of the exit opening. The inner portions of the wave-propagating channels are symmetrical about the central axis. The exit opening of each of the wave-propagating channels is symmetrical about the central line of the corresponding one of the wave-propagating channels. The main body is further formed with a plurality of periodically disposed grooves in the exit side. Each of the grooves has an inner dimension not greater than half of the wavelength of the electromagnetic wave. Adjacent ones of the grooves are spaced apart from each other by a distance not greater than the wavelength of the electromagnetic wave.

At least one of the inner dimension and depth of each of the grooves and the distance between adjacent ones of the grooves is set such that the electromagnetic wave propagating structure is adapted to allow an electromagnetic wave to propagate from the wave emanating block therethrough via the wave-propagating channels for superimposing near the central axis and for continuing to propagate as a super collimated beam.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
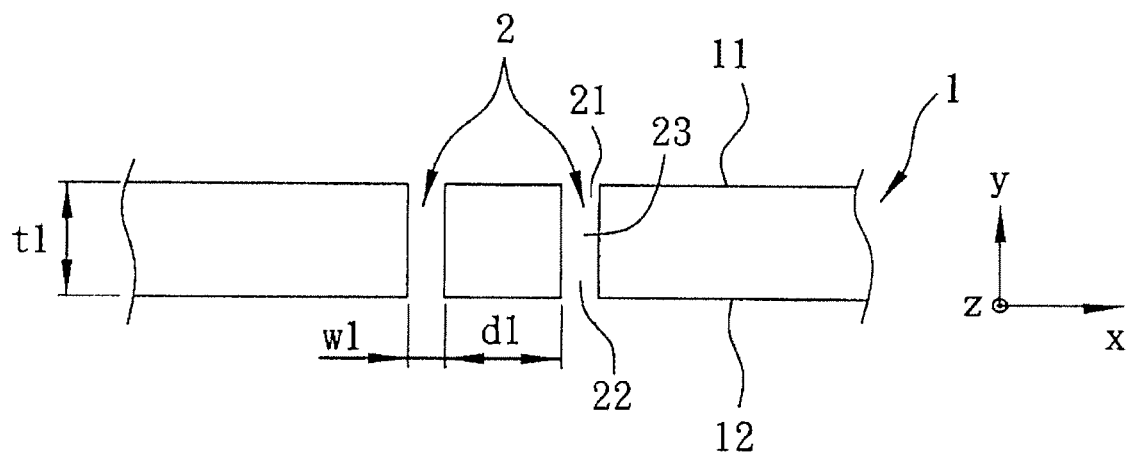
FIG. 1 is a schematic diagram of the first preferred embodiment of an electromagnetic wave propagating structure according to the present invention.

Before the present invention is described in greater detail, it should be noted that like elements are denoted by the same reference numerals throughout the disclosure.

Referring to FIG. 1, the first preferred embodiment of an electromagnetic wave propagating structure according to the present invention is adapted to allow propagation of an electromagnetic wave therethrough. Due to the universality of the Maxwell equations, the electromagnetic wave propagating structure of the present invention is universally adaptable for electromagnetic waves having various wavelengths and frequencies, which include visible light, non-visible light, etc. The electromagnetic wave propagating structure includes a main body 1 formed with two wave-propagating channels 2 that are adapted to change propagating direction and energy distribution of an electromagnetic wave once the electromagnetic wave propagates therethrough.

The main body 1 has surfaces capable of blocking propagation of the electromagnetic wave, and includes an incident side 11 and an exit side 12 opposite to the incident side 11 in a wave-propagating direction (y).

The two wave-propagating channels 2 are formed spacedly in the main body 1 therethrough. Each of the wave-propagating channels 2 extends from the incident side 11 to the exit side 12, and has an incident opening 21 at the incident side 11, an exit opening 22 at the exit side 12, and an inner portion 23 extending between the incident opening 21 and the exit opening 22. The inner portion 23 of each of the wave-propagating channels 2 has an inner dimension that is not larger than half of a wavelength ($\lambda$) of the electromagnetic wave that is to be propagated therethrough. In addition, the distance between the two wave-propagating channels 2 is not larger than the wavelength ($\lambda$) of the electromagnetic wave that is to be propagated therethrough. When the electromagnetic wave propagates from the incident side 11 of the main body 1 toward the exit side 12 through the two wave-propagating channels 2, sub-wavelength antenna and light bending effects are generated at and near the exit areas of the main body 1 close to the two wave-propagating channels 2, leading to changes in the propagating direction and energy distribution of the electromagnetic wave once the electromagnetic wave exits the two wave-propagating channels 2.

In this embodiment, each of the wave-propagating channels 2 is defined by a channel surface made from a material that enhances transmission of electromagnetic waves. Preferably, the channel surfaces of the wave-propagating channels 2 are metallic.

The effects achieved by the electromagnetic wave propagating structure were verified through simulations using the finite-difference time-domain (FDTD) method. The main body 1, which is made from a dispersive material such as a silver film or other materials that react strongly to electromagnetic waves, was modeled by the auxiliary difference equation method with Drude poles (which is the representation of the media of Drude model). Further, phasor polarized current was calculated in the simulations. The relationship between the electromagnetic wave propagating structure of the present invention and the behavior of the electromagnetic wave to be propagated through the electromagnetic wave propagating structure was verified by the simulation results that will be presented hereinbelow. Furthermore, the resultant focused light spot serves to verify the effects achieved by the electromagnetic wave propagating structure of the present invention.

Unless specified otherwise, the simulation system is 2-dimensional, and is represented by a grid system having 600× 600 cells of Yee space lattice with a unit cell length of 4 nm. Each cell of the grid system is represented by an index $(I_x, I_y)$, where $(I_x)$ and $(I_y)$ respectively correspond to cell location in the first direction (x) and the wave-propagating direction (y) that are orthogonal to each other. It should be noted herein that the wave-propagating direction (y) is also referred interchangeably as the second direction (y) in this disclosure. $(I_x)$ and $(I_y)$ both have values that range from 1 to 600. The origin of the simulation system is located at index $(I_x, I_y)=(300, 360)$. The simulation system is also represented by a coordinate system that corresponds to the real dimensions of the grid system, which is 2.4 μm by 2.4 μm. The coordinate system includes coordinates $(C_x, C_y)$, where $(C_x)$ has values that range from to −1.2 to 1.2 and $(C_y)$ has values that range from −1.44 to 0.96, and where the origin is located at coordinate $(C_x, C_y)=(0, 0)$. In the simulation, the main body 1 is set to have a thickness (t1) in the wave-propagating direction (y) of 240 nm (i.e., a distance between the incident side 11 and the exit side 12 of the main body 1 in the wave-propagating direction (y) is 240 nm). Therefore, in the grid system, the incident side 11 and the exit side 12 of the main body 1 are respectively located at $(I_y=390)$ and $(I_y=331)$. The inner dimension (w1) of the inner portion 23 of each of the wave-propagating channels 2 is 80 nm (i.e., channel width in the first direction (x) is 80 nm), and the distance (d1) in the first direction (x) between the two wave-propagating channels 2 is 240 nm. Further, the electromagnetic wave source is located at $(I_y=590)$ in the grid system, and the electromagnetic wave propagates in the second direction (y) with decreasing $(I_y)$ values, and has a wavelength of 633 nm. The electric field and the magnetic field are polarized respectively in the first direction (x) and a third direction (z) orthogonal to both the first direction (x) and the second direction (y), and are normalized as unity. Both boundaries for the first direction (x) of the simulation system at the non-negative portion in the second direction (y) of the coordinate system are set to be periodic in order to minimize numerical reflection and errors, while all other boundaries are set as Perfectly Matched Layer Absorbing Boundary Conditions. The time is normalized to the period of the electromagnetic wave, and the time step (dt) in the simulation is 0.004.

It should be further noted herein that directional terms, such as "downward", "outward", "right-hand", etc., as used in this disclosure with reference to the accompanying drawings are to be interpreted with their respective conventional meanings with reference to the drawing sheets in which the figures are presented.

Figure 2:
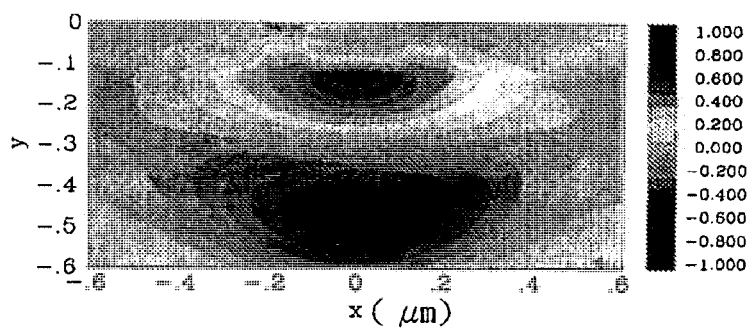
FIG. 2 is a magnetic field intensity diagram, illustrating a simulation result of a z-direction magnetic field obtained for the first preferred embodiment.
Figure 3:
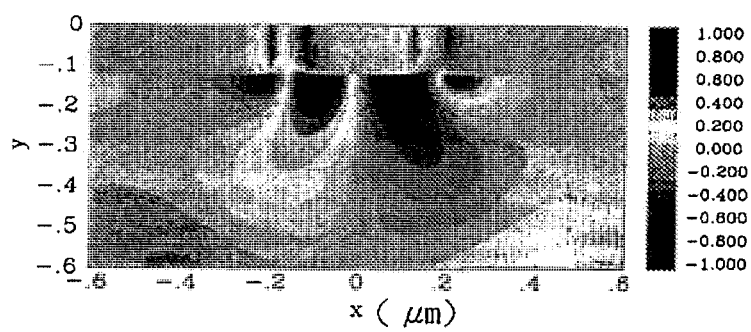
FIG. 3 is an electric field intensity diagram, illustrating a simulation result of a y-direction electric field obtained for the first preferred embodiment.

With reference to FIG. 1 and FIG. 2, at time=9.2, after the electromagnetic wave has propagated through the two wave-propagating channels 2, the magnetic fields in the third direction (z), also referred to as the z-direction magnetic fields $(H_z)$, exiting the two wave-propagating channels 2 overlap at a central portion corresponding to a central axis of the main body 1, i.e., corresponding to $(C_x)$ of approximately 0. With reference to FIG. 1 and FIG. 3, the electric fields in the wave-propagating direction (y), also referred to as the y-direction electric fields $(E_y)$ exiting the two wave-propagating channels 2 cancel out at the central portion, and the energy thereof is converted into the z-direction magnetic field $(H_z)$ and the electric field in the first direction (x), also referred to as the x-direction electric field $(E_x)$. This phenomenon is one of the sub-wavelength antenna effects.

Figure 4:
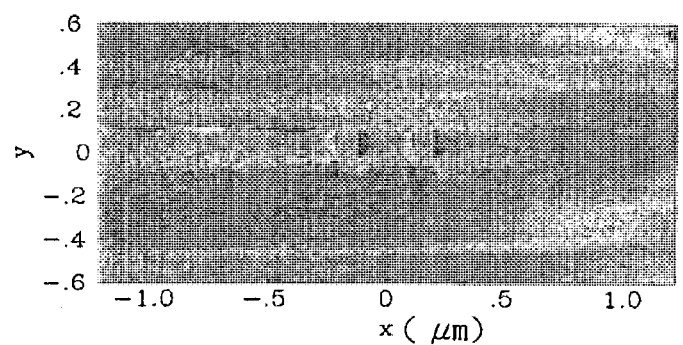
FIG. 4 is a current intensity diagram, illustrating a simulation result of a y-direction polarized current obtained for the first preferred embodiment.
Figure 5:
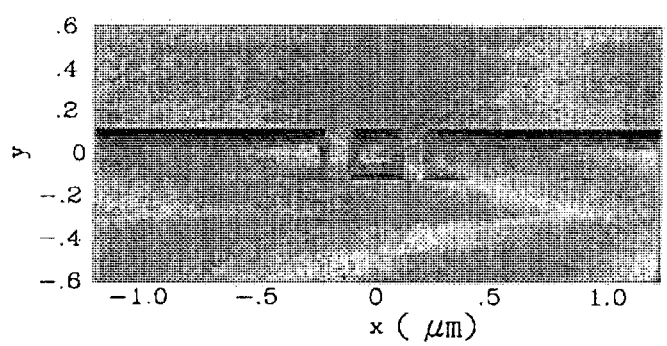
FIG. 5 is a current intensity diagram, illustrating a simulation result of a x-direction polarized current obtained for the first preferred embodiment.

With reference to FIG. 1, FIG. 4 and FIG. 5, the excitation of the surface currents and electromagnetic wave at the incident side 11 of the main body 1 and the coupling of the electromagnetic wave with the two wave-propagating channels 2 result in surface plasma movement and surface plasmon. Simultaneously, the electromagnetic wave, when traveling through each of the wave-propagating channels 2, polarizes surfaces defining the inner portion 23 of the corresponding one of the channels 2 such that the resultant polarized charges and current flow downward along with the electromagnetic wave toward the exit side 12 of the main body 1. The flowing polarized charges and current produce additional magnetic field in the third direction (z), i.e., ($H_z$), as a result of the sub-wavelength antenna effects.

Figure 6:
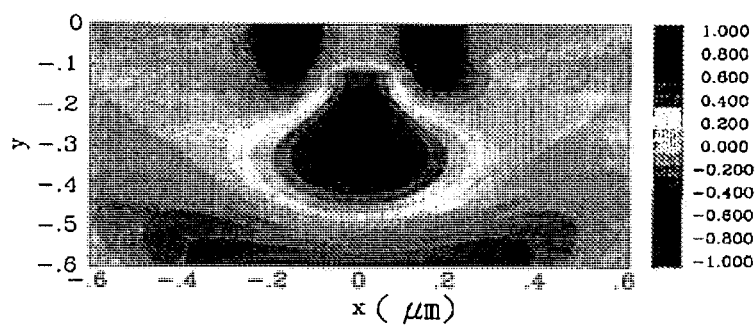
FIG. 6 is a magnetic field intensity diagram, illustrating another simulation result of the z-direction magnetic field obtained for the first preferred embodiment.
Figure 7:
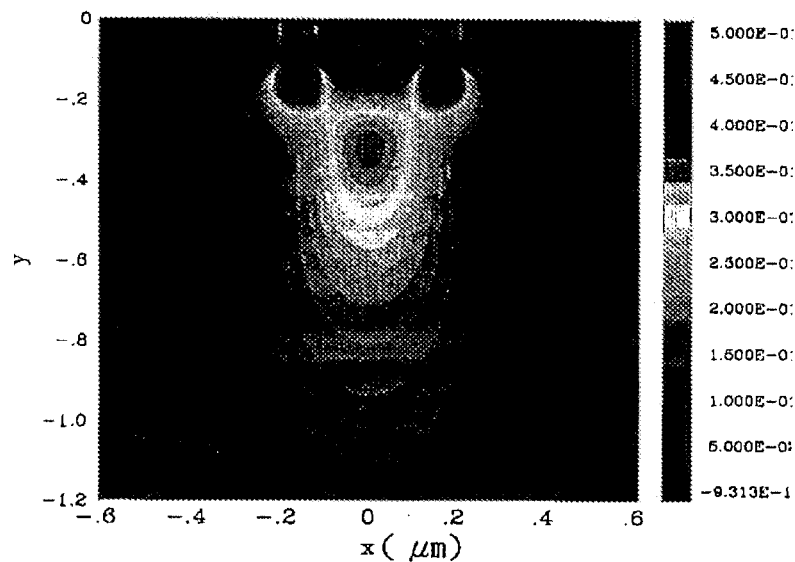
FIG. 7 illustrates a simulation result of a time-averaged x-direction electric field energy distribution obtained for the first preferred embodiment.
Figure 8:
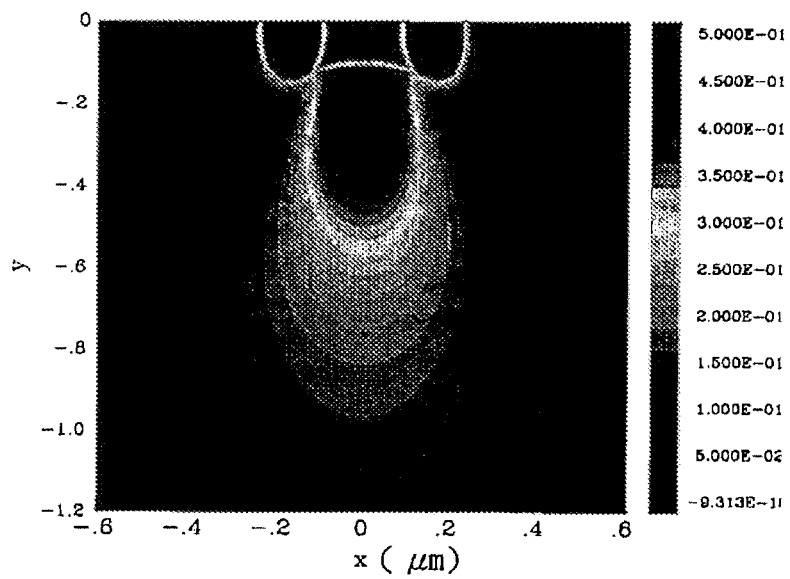
FIG. 8 is illustrates a simulation result of a time-averaged z-direction magnetic field energy distribution obtained for the first preferred embodiment.

With reference to FIG. 1 and FIG. 6, at time=9.5, the z-direction magnetic field ($H_z$) is focused downwardly of the exit side 12 with the main body 1 as the reference, at which time the amplitude of the z-direction magnetic field ($H_z$) is 0.757. With reference to FIG. 7 and FIG. 8, it can be verified from the time-averaged energy distributions of the x-direction electric field ($E_x$) and the z-direction magnetic field ($H_z$) that after the electromagnetic wave is focused at time=9.5 with an energy averaged spot size of 0.366λ, (a FWHM spot size of 0.386λ), which is smaller than half of the wavelength of the electromagnetic wave, the electromagnetic wave continues to propagate downward with a high intensity.

Figure 9:
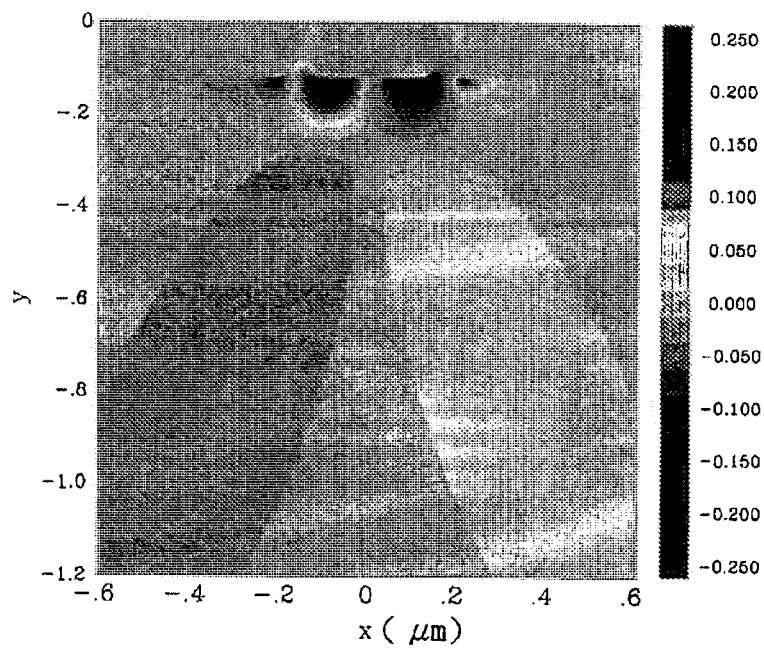
FIG. 9 illustrates a simulation result of time-averaged field energy flow of a x-direction Poynting vector of the electric field and magnetic field obtained for the first preferred embodiment.
Figure 10:
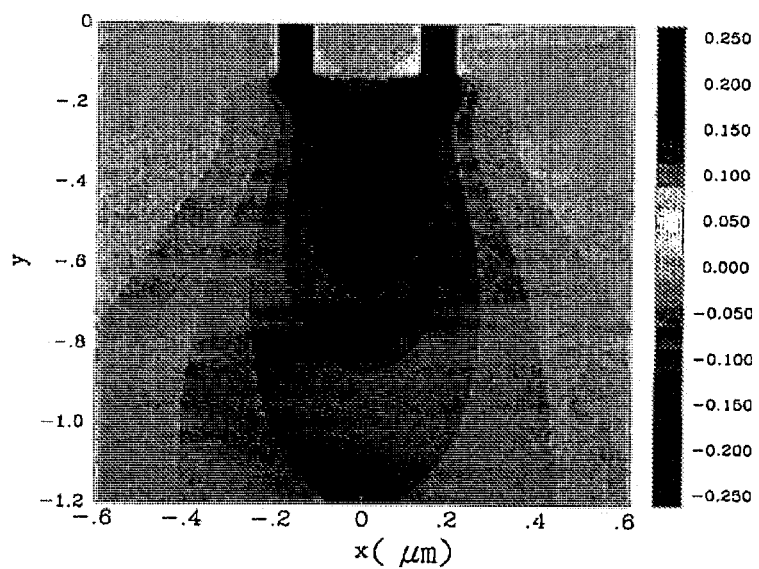
FIG. 10 illustrates a simulation result of time-averaged field energy flow of a y-direction Poynting vector of the electric field and magnetic field obtained for the first preferred embodiment.

With reference to FIG. 1, FIG. 9 and FIG. 10, the propagation and focusing of the electromagnetic wave can also be verified by Poynting vectors (S1, S2) of the electric field and the magnetic field. As illustrated in FIG. 9, the x-direction Poynting vector (S1) and the field energy flow toward the central portion of the main body 1. The y-direction Poynting vector (S2) and the field energy are focused downwardly of the exit side 12 of the main body 1 and continue to propagate downward and outward afterwards, indicating that the electromagnetic wave is a travelling electromagnetic wave.

The present invention, utilizing recent scientific advancements, surpasses the conventional wave theory, which indicates that the light cannot be transmitted through a sub-wavelength slit. However, as also verified from the simulation results obtained above for the first preferred embodiment of the electromagnetic wave propagating structure according to the present invention, the excitation of surface charge movement or a charge density wave on a metallic surface enhance the transmission of the electromagnetic wave. In addition, focusing of the electromagnetic wave into a light spot smaller than half of the wavelength of the electromagnetic wave is achieved by utilizing the sub-limit wave functions within the wave-propagating channels 2 of the innovative electromagnetic wave propagating structure. The wave function across the wave-propagating channels 2 is close to a constant and drops sharply on the surface of the main body 1. It should be noted herein that this kind of function with spatial eigenvalue (i.e., wave number) k=0 mode bounded within a sub-limit scale is not considered in the conventional theories on the diffraction limit, and thus does not fall within corresponding scopes.

Figure 11:
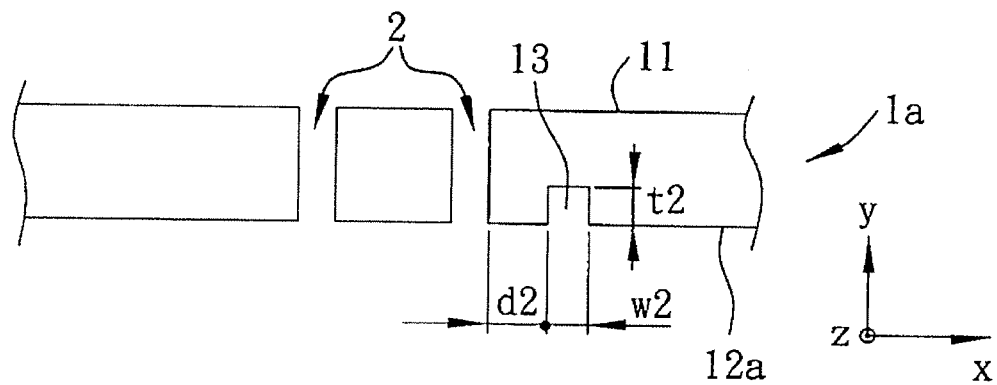
FIG. 11 is a schematic diagram of the second preferred embodiment of an electromagnetic wave propagating structure according to the present invention.

With reference to FIG. 11, the second preferred embodiment of an electromagnetic wave propagating structure according to the present invention differs from the first preferred embodiment in that the main body 1a of the second preferred embodiment is further formed with at least one groove 13 at the exit side 12a. The groove 13 has an inner dimension that is not larger than half of the wavelength of the electromagnetic wave that is to be propagated through the wave-propagating channels 2, and is spaced apart from an adjacent one of the wave-propagating channels 2 by a distance not greater than the wavelength of the electromagnetic wave. In addition, a "pushing", "squeezing" or "compressing" phenomenon occurs in the focused light spot formed from the electromagnetic wave that propagates through the wave-propagating channels 2 of the second preferred embodiment such that the size of the focused light spot is diminished once again, and such that changes occur in the propagating direction and energy distribution of the electromagnetic wave downwardly of the exit side 12a of the main body 1a. In this embodiment, the main body 1a is formed with one groove 13 for illustration purposes.

Figure 12:
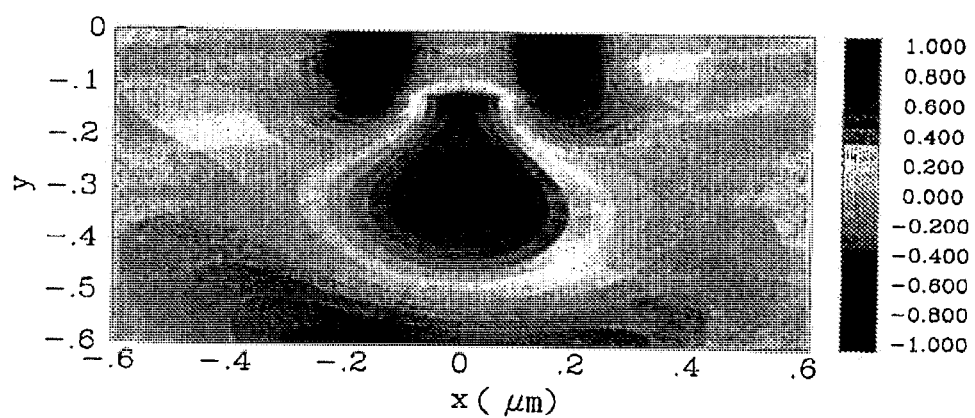
FIG. 12 is a magnetic field intensity diagram, illustrating a simulation result of a z-direction magnetic field obtained for the second preferred embodiment.

A simulation similar to the one conducted above for the first preferred embodiment was conducted for the second preferred embodiment. In the simulation system, the groove 13 has a groove depth (t2) in the wave-propagating direction (y) and a groove width (w2) in the first direction (x); both set to be 80 nm. In addition, the distance (d2) between the right-hand one of the wave-propagating channels 2 and the groove 13 in the first direction (x) is set to be 120 nm. With further reference to FIG. 12, at time=9.5 when the electromagnetic wave has been verified to travel through the wave-propagating channels 2, the z-direction magnetic field (Hz) is focused downwardly of the exit side 12a into a light spot that has an energy averaged spot size of 0.328λ (a FWHM spot size of 0.378λ) and an amplitude of 0.791, and that is smaller than half of the wavelength of the electromagnetic wave. In addition, the light spot is asymmetrical due to the "squeezed" or "compressed" phenomenon.

Figure 13:
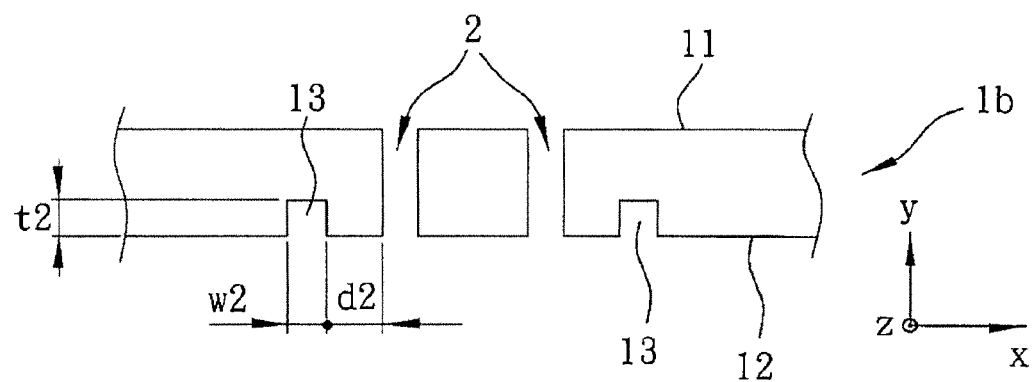
FIG. 13 is a schematic diagram of the third preferred embodiment of an electromagnetic wave propagating structure according to the present invention.

As shown in FIG. 13, the third preferred embodiment of an electromagnetic wave propagating structure according to the present invention differs from the second preferred embodiment in that the main body 1b of the third preferred embodiment is further formed with two of the grooves 13 at the exit side 12b. The grooves 13 are symmetrically disposed about a central axis of the main body 1b, and are disposed to interpose the wave-propagating channels 2 therebetween. In addition, the grooves 13 serve to squeeze the focused light spot.

Effects similar to those disclosed hereinabove are achieved by the third preferred embodiment, where the electromagnetic wave is focused into a light spot having a size smaller than half of the wavelength of the electromagnetic wave.

Figure 14:
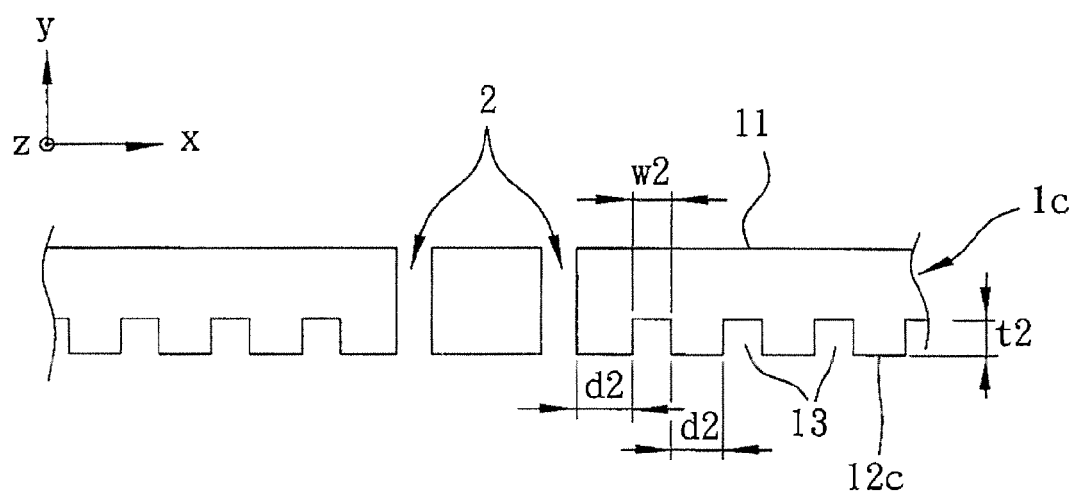
FIG. 14 is a schematic diagram of the fourth preferred embodiment of an electromagnetic wave propagating structure according to the present invention.

As shown in FIG. 14, the fourth preferred embodiment of an electromagnetic wave propagating structure according to the present invention differs from the third preferred embodiment in that the main body 1c of the fourth preferred embodiment is further formed with a plurality of the grooves 13 at the exit side 12c. The grooves 13 are periodically spaced apart from each other, and the distance between each adjacent pair of the grooves 13 is not larger than the wavelength of the electromagnetic wave.

Effects similar to those disclosed hereinabove are achieved by the fourth preferred embodiment, where the electromagnetic wave is focused into a light spot having a size smaller than half of the wavelength of the electromagnetic wave.

Similarly, when the incident side 11 is formed with at least one groove, the physical behavior of the electromagnetic wave coupling into and after propagating through the wave-propagating channels 2 will change. An example is provided hereinbelow.

Figure 15:
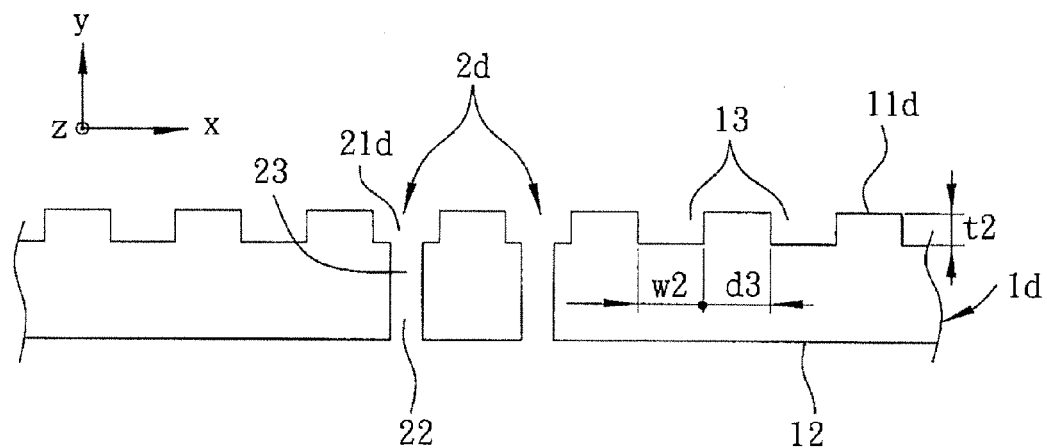
FIG. 15 is a schematic diagram of the fifth preferred embodiment of an electromagnetic wave propagating structure according to the present invention.

As shown in FIG. 15, the fifth preferred embodiment of an electromagnetic wave propagating structure according to the present invention differs from the first preferred embodiment in that the main body 1d of the fifth preferred embodiment is further formed with a plurality of periodically spaced apart grooves 13 at the incident side 11d. Each of the grooves 13 has an inner dimension that is not larger than half of the wavelength of the electromagnetic wave. In addition, the distance between each adjacent pair of the grooves 13 is not larger than the wavelength of the electromagnetic wave. In this embodiment, two of the grooves 13 are respectively disposed in spatial communication with the wave-propagating channels 2d such that the incident opening 21d of each of the wave-propagating channels 2d at the incident side 11d has an inner dimension not smaller than that of the inner portion 23 of each of the wave-propagating channels 2d between the incident opening 21d and the exit opening 22.

Similar to the previous embodiments, the fifth preferred embodiment also results in focusing of the electromagnetic wave into a light spot having a size smaller than half of the wavelength of the electromagnetic wave.

Figure 16:
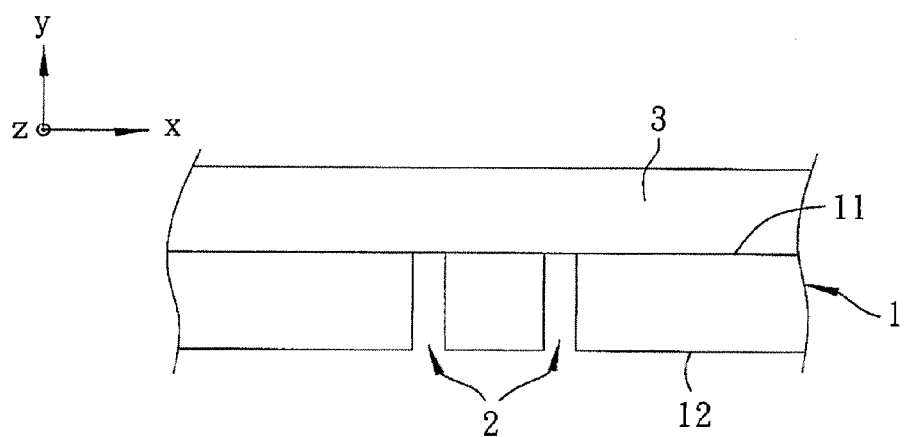
FIG. 16 is a schematic diagram of the sixth preferred embodiment of an electromagnetic wave propagating structure according to the present invention.

It should be noted herein that the electromagnetic wave propagating structure of the preferred embodiments disclosed hereinabove can also involve the use of a dielectric material. For instance, as shown in FIG. 16, the fifth preferred embodiment of an electromagnetic wave propagating structure according to the present invention differs from the first preferred embodiment in the inclusion of a light-transmissible dielectric layer 3 disposed on the incident side 11 of the main body 1 for supporting the main body 1, for generating a waveguide effect, and for changing the propagating behavior of the electromagnetic wave that is to be propagated through the electromagnetic wave propagating structure. In this embodiment, the light-transmissible dielectric layer 3 is made from glass.

It was verified by simulation that the sixth preferred embodiment also achieves the effect of focusing of the electromagnetic wave into a light spot having a size smaller than half of the wavelength of the electromagnetic wave.

Figure 17:
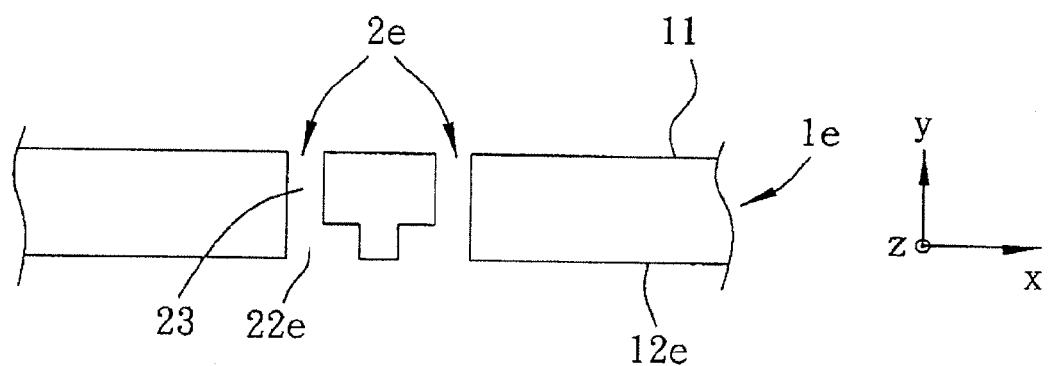
FIG. 17 is a schematic diagram of the seventh preferred embodiment of an electromagnetic wave propagating structure according to the present invention.

As shown in FIG. 17, the seventh preferred embodiment of an electromagnetic wave propagating structure according to the present invention differs from the first preferred embodiment in that the exit opening 22e of each of the wave-propagating channels 2e is shaped asymmetrically about the central line of the inner portion 23 of the corresponding one of the wave-propagating channels 2e. The effect is that bending of the electromagnetic wave occurs after exiting the two wave-propagating channels 2e via the exit openings 22e, in which the electromagnetic wave, while maintaining a substantially unchanged energy distribution near the central axis of the main body 1e, continues to propagate downwardly away from the exit side 12e of the main body 1e toward the central axis of the main body 1e and is eventually focused into a light spot.

Figure 18:
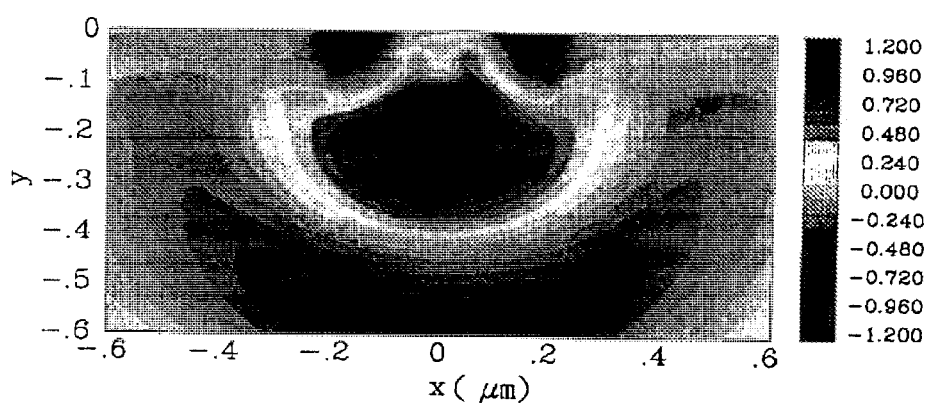
FIG. 18 is a magnetic field intensity diagram, illustrating a simulation result of a z-direction magnetic field obtained for the seventh preferred embodiment.

With reference to FIG. 18, at time=9.26 during a simulation similar to the ones conducted above when the electromagnetic wave has propagated through the two wave-propagating channels 2e of the seventh preferred embodiment, the z-direction magnetic field ($H_z$) is focused into a light spot (with an amplitude of 1.30) having an energy averaged size of $0.341\lambda$ (or a FWHM spot size of $0.364\lambda$), which is smaller than half of the wavelength of the electromagnetic wave.

Figure 19:
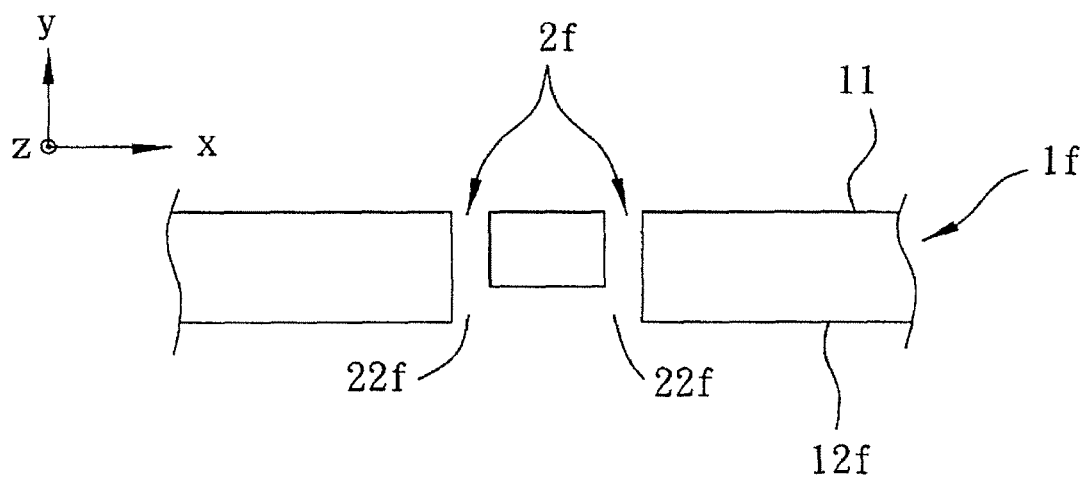
FIG. 19 is a schematic diagram of the eighth preferred embodiment of an electromagnetic wave propagating structure according to the present invention.

As shown in FIG. 19, the eighth preferred embodiment of an electromagnetic wave propagating structure according to the present invention differs from the seventh preferred embodiment in that the exit openings 22f of the two wave-propagating channels 2f are disposed in direct spatial communication with each other in the first direction (x).

Figure 20:
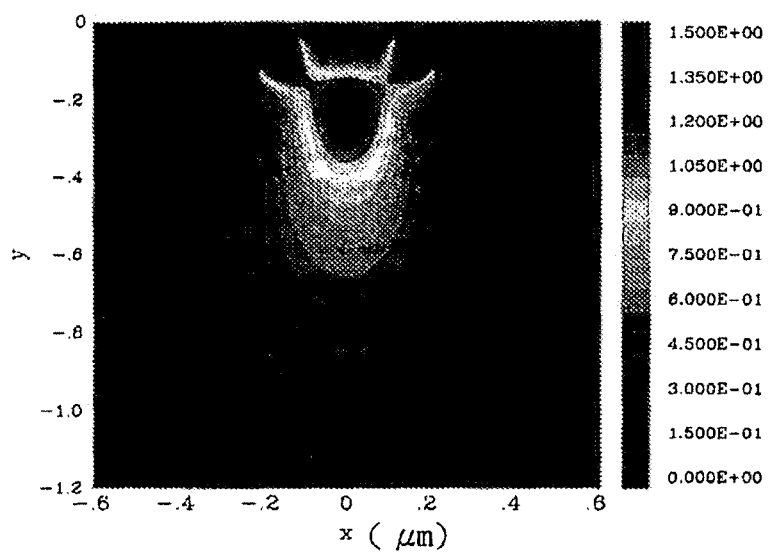
FIG. 20 illustrates a simulation result of a time-averaged x-direction electric field energy distribution obtained for the eighth preferred embodiment.

With reference to FIG. 19 and FIG. 20, it can be verified from the time-averaged energy distributions of the x-direction electric field ($E_x$) that the eighth preferred embodiment also achieves a focused spot size of smaller than half of the wavelength of the electromagnetic wave, and that the electromagnetic wave bends after exiting the two wave-propagating channels 2f via the exit openings 22f prior to focusing into the light spot. Furthermore, after propagating toward the central axis of the main body 1f and being focused into the light spot, the electromagnetic wave continues to propagate with a high intensity.

Figure 21:
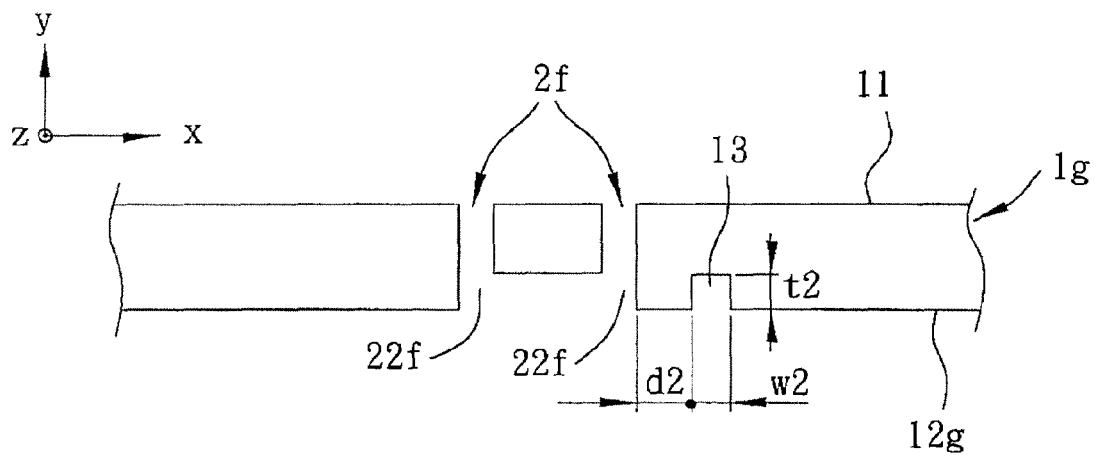
FIG. 21 is a schematic diagram of the ninth preferred embodiment of an electromagnetic wave propagating structure according to the present invention.

As shown in FIG. 21, the ninth preferred embodiment of an electromagnetic wave propagating structure according to the present invention differs from the eighth preferred embodiment in that the main body 1g is further formed with a groove 13 on the exit side 12g. The groove 13 has an inner dimension not greater than half of the wavelength of the electromagnetic wave. As a result, the "squeezed" or "compressed" phenomenon occurs in the focused light spot such that the size of the focused light spot is diminished once again, and such that changes occur in the propagating direction and energy distribution of the electromagnetic wave after the electromagnetic wave exits the wave-propagating channels 2f via the exit openings 22f. In this embodiment, the main body 1g is formed with one groove 13 for illustration purposes.

In a simulation similar to the ones conducted above for the previous embodiments, the ninth preferred embodiment was verified to achieve the effect of focusing of the electromagnetic wave into a light spot having a size smaller than half of the wavelength of the electromagnetic wave. In addition, similar to the second preferred embodiment, the light spot is asymmetrical due to the "squeezed" or "compressed" phenomenon.

Figure 22:
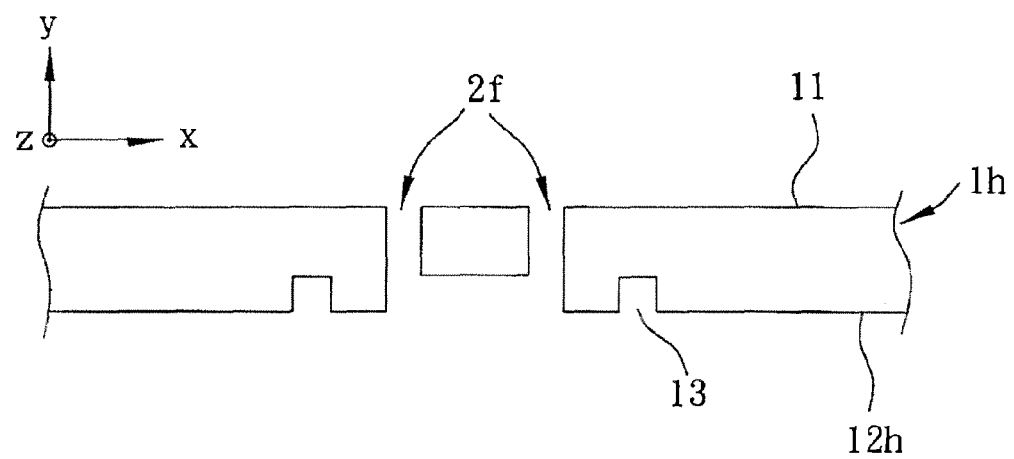
FIG. 22 is a schematic diagram of the tenth preferred embodiment of an electromagnetic wave propagating structure according to the present invention.

As shown in FIG. 22, the tenth preferred embodiment of an electromagnetic wave propagating structure according to the present invention differs from the ninth preferred embodiment in that the main body 1h of the tenth preferred embodiment is formed with two of the grooves 13 at the exit side 12h. The grooves 13 are symmetrically disposed about a central axis of the main body 1h, and are disposed to interpose the wave-propagating channels 2f therebetween. In addition, the grooves 13 serve to compress the focused light spot.

It was verified through simulation that the tenth preferred embodiment also achieves the effect of focusing of the electromagnetic wave into a light spot having a size smaller than half of the wavelength of the electromagnetic wave.

Figure 23:
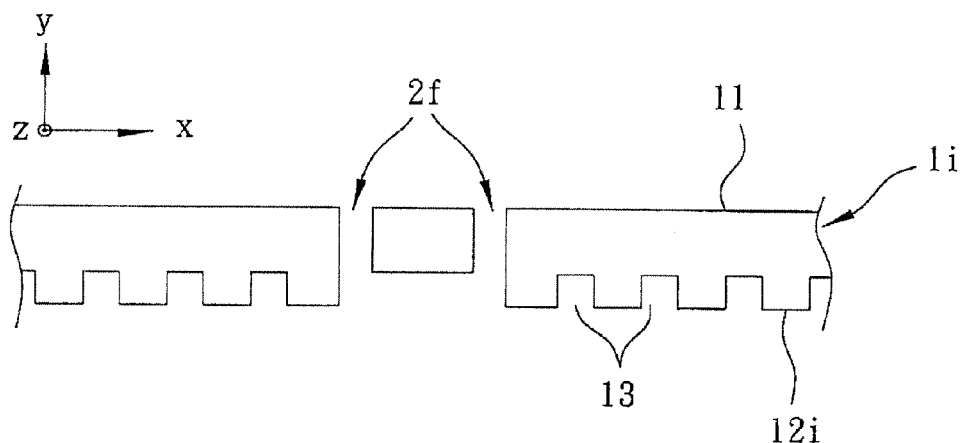
FIG. 23 is a schematic diagram of the eleventh preferred embodiment of an electromagnetic wave propagating structure according to the present invention.

As shown in FIG. 23, the eleventh preferred embodiment of an electromagnetic wave propagating structure according to the present invention differs from the eighth preferred embodiment in that the main body 1i of the eleventh preferred embodiment is formed with a plurality of the grooves 13 at the exit side 12i. The grooves 13 are periodically spaced apart from each other, and the distance between each adjacent pair of the grooves 13 is not larger than the wavelength of the electromagnetic wave.

It was verified through simulation that the eleventh preferred embodiment similarly achieves the effect of focusing of the electromagnetic wave into a light spot having a size smaller than half of the wavelength of the electromagnetic wave.

Similarly, when the incident side is formed with at least one groove, the physical behavior of the electromagnetic wave coupling into and after propagating through the wave-propagating channels will change. An example is provided hereinbelow.

Figure 24:
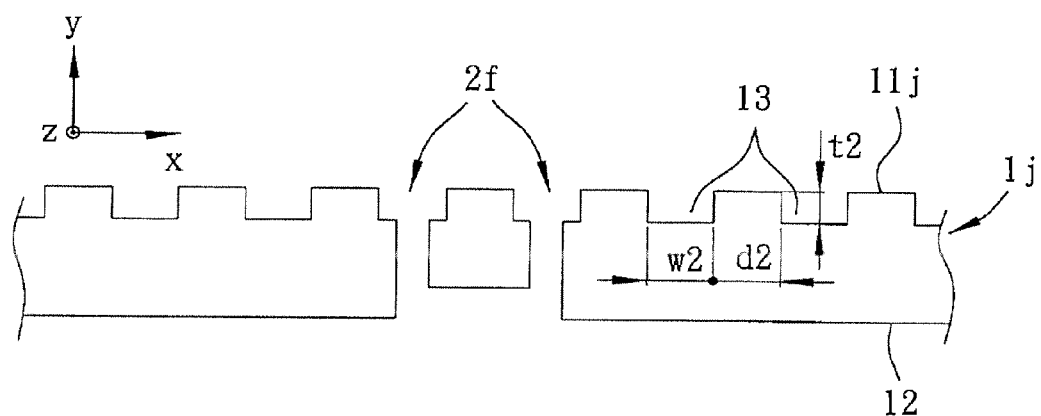
FIG. 24 is a schematic diagram of the twelfth preferred embodiment of an electromagnetic wave propagating structure according to the present invention.

As shown in FIG. 24, the twelfth preferred embodiment of an electromagnetic wave propagating structure according to the present invention differs from the eighth preferred embodiment in that the main body 1j of the twelfth preferred embodiment is further formed with a plurality of periodically spaced apart grooves 13 at the incident side 11j. Each of the grooves 13 has an inner dimension that is not larger than half of the wavelength of the electromagnetic wave. In addition, the distance between each adjacent pair of the grooves 13 is not larger than the wavelength of the electromagnetic wave.

In a simulation similar to the ones conducted above for the previous embodiments, the twelfth preferred embodiment was verified to achieve the effect of focusing of the electromagnetic wave into a light spot having a size smaller than half of the wavelength of the electromagnetic wave.

Figure 25:
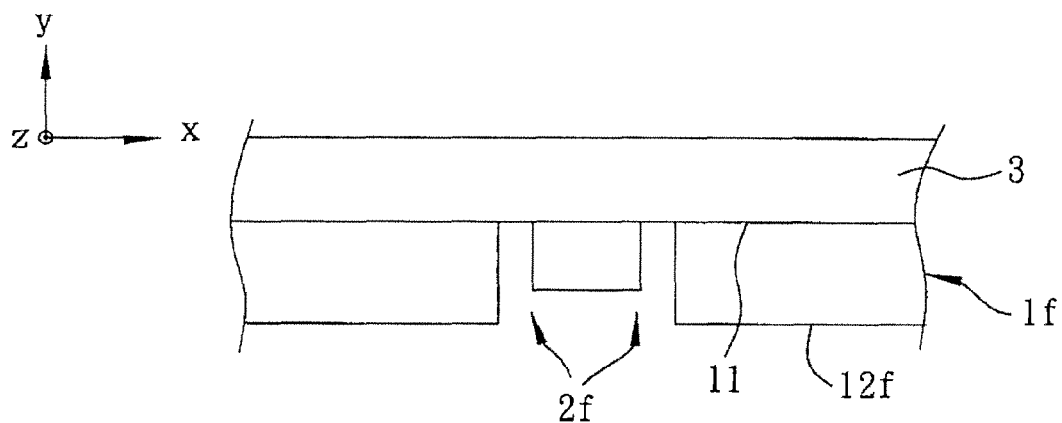
FIG. 25 is a schematic diagram of the thirteenth preferred embodiment of an electromagnetic wave propagating structure according to the present invention.

It should be noted herein that the electromagnetic wave propagating structure of the seventh to twelfth preferred embodiments disclosed hereinabove can also involve the use of a dielectric material. For instance, as shown in FIG. 25, the thirteenth preferred embodiment of an electromagnetic wave propagating structure according to the present invention differs from the eighth preferred embodiment in the inclusion of a light-transmissible dielectric layer 3 disposed on the incident side 11 of the main body 1f, for supporting the main body 1f, for generating the waveguide effect, and for changing the propagating behavior of the electromagnetic wave that is to be propagated through the electromagnetic wave propagating structure. In this embodiment, the light-transmissible dielectric layer 3 is made from glass. It was verified through simulation that the thirteenth preferred embodiment also achieves focusing of the electromagnetic wave into a light spot having a size smaller than half of the wavelength of the electromagnetic wave.

Figure 26:
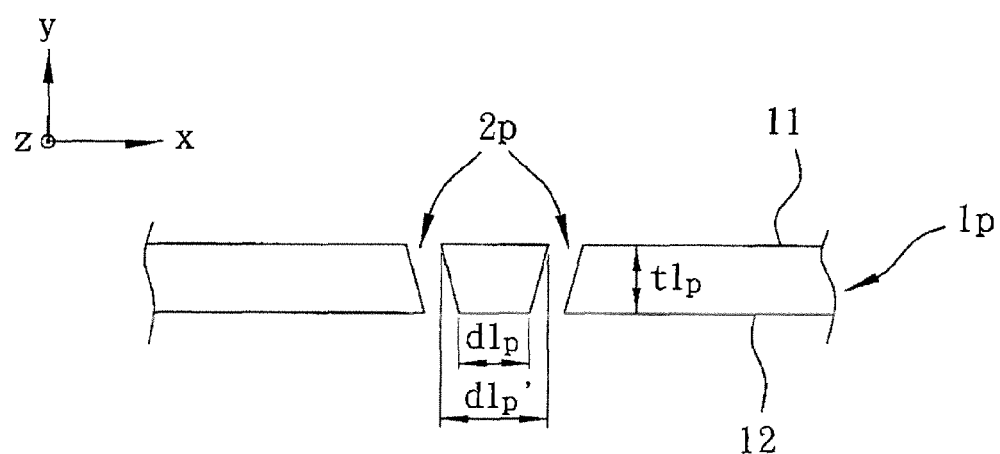
FIG. 26 is a schematic diagram of the fourteenth preferred embodiment of an electromagnetic wave propagating structure according to the present invention.

As shown in FIG. 26, the fourteenth preferred embodiment of an electromagnetic wave propagating structure according to the present invention differs from the first preferred embodiment in that the central lines of the wave-propagating channels 2p of the fourteenth preferred embodiment extend toward the central axis of the main body 1p from the incident side 11 toward the exit side 12 (i.e., the distance between each of the central lines and the central axis decreases gradually from the incident side 11 toward the exit side 12).

For the fourteenth preferred embodiment, the simulation system is also represented by a grid system having 600×600 cells of Yee space lattice with a unit cell length of 4 nm. In the simulation, the main body 1p is set to have a thickness ($t1_p$) in the wave-propagating direction (y) of 160 nm (i.e., a distance between the incident side 11 and the exit side 12 of the main body 1p in the wave-propagating direction (y) is 160 nm). The inner dimension (w1) of the inner portion 23 of each of the wave-propagating channels 2p is 80 nm (i.e., channel width in the first direction (x) is 80 nm). The distance ($d1_p$) in the first direction (x) between the two wave-propagating channels 2p at the incident side 11 is 240 nm, and the distance ($d1_p'$) in the first direction (x) between the two wave-propagating channels 2p at the exit side 12 is 200 nm. Other simulation parameters are identical to those disclosed hereinabove for the first preferred embodiment.

Figure 27:
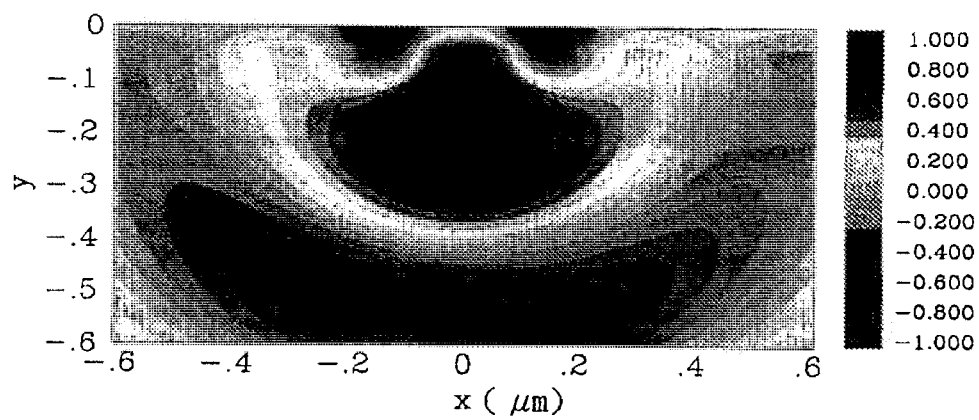
FIG. 27 is a magnetic field intensity diagram, illustrating a simulation result of a z-direction magnetic field obtained for the fourteenth preferred embodiment.

With reference to FIG. 26 and FIG. 27, at time=9.18, after the electromagnetic wave has propagated through the two wave-propagating channels 2p, the z-direction magnetic fields ($H_z$) are focused into a light spot (with an amplitude of 1.159) having an energy averaged size of 0.376λ (or a FWHM spot size of 0.418λ), which is smaller than half of the wavelength of the electromagnetic wave.

Figure 28:
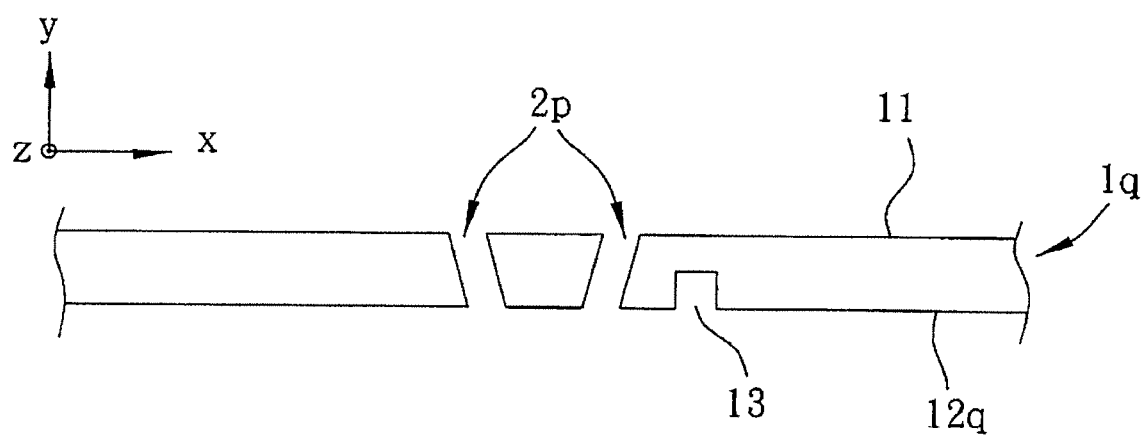
FIG. 28 is a schematic diagram of the fifteenth preferred embodiment of an electromagnetic wave propagating structure according to the present invention.

As shown in FIG. 28, the fifteenth preferred embodiment of an electromagnetic wave propagating structure according to the present invention differs from the fourteenth preferred embodiment in that the main body 1q of the fifteenth preferred embodiment is further formed with at least one groove 13 at the exit side 12q. The groove 13 has an inner dimension that is not larger than half of the wavelength of the electromagnetic wave that is to be propagated through the wave-propagating channels 2p, and is spaced apart from an adjacent one of the wave-propagating channels 2 by a distance not greater than the wavelength of the electromagnetic wave. In addition, the "pushing", "squeezing" or "compressing" phenomenon occurs in the focused light spot formed from the electromagnetic wave that propagates through the wave-propagating channels 2p of the fifteenth preferred embodiment such that the size of the focused light spot is diminished once again, and such that changes occur in the propagating direction and energy distribution of the electromagnetic wave downwardly of the exit side 12q of the main body 1q. In this embodiment, the main body 1q is formed with one groove 13 for illustration purposes.

It was verified by simulation that the fifteenth preferred embodiment also achieves the effect of focusing of the electromagnetic wave into a light spot having a size smaller than half of the wavelength of the electromagnetic wave. In addition, the light spot is asymmetrical due to the "squeezed" or "compressed" phenomenon.

Figure 29:
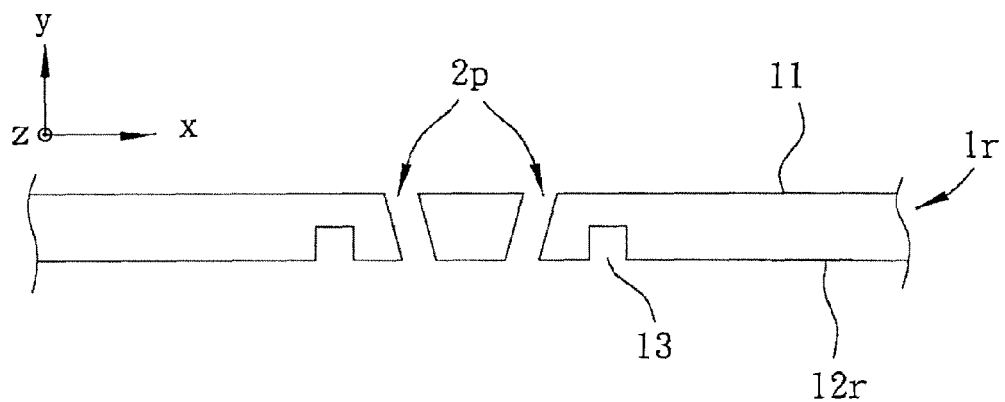
FIG. 29 is a schematic diagram of the sixteenth preferred embodiment of an electromagnetic wave propagating structure according to the present invention.

As shown in FIG. 29, the sixteenth preferred embodiment of an electromagnetic wave propagating structure according to the present invention differs from the fourteenth preferred embodiment in that the main body 1r of the sixteenth preferred embodiment is further formed with two of the grooves 13 at the exit side 12r. The grooves 13 are symmetrically disposed about a central axis of the main body 1r, and are disposed to interpose the wave-propagating channels 2p therebetween. In addition, the grooves 13 serve to squeeze the focused light spot.

As verified through simulation, effects similar to those disclosed hereinabove are achieved by the sixteenth preferred embodiment, where the electromagnetic wave is focused into a light spot having a size smaller than half of the wavelength of the electromagnetic wave.

Figure 30:
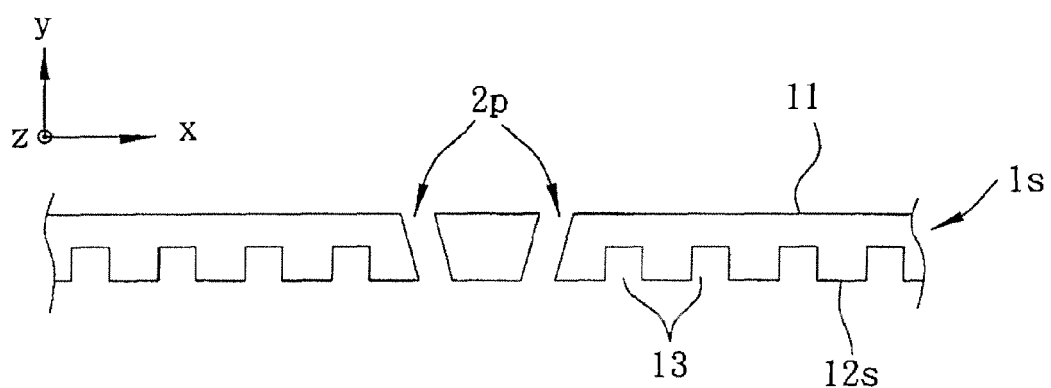
FIG. 30 is a schematic diagram of the seventeenth preferred embodiment of an electromagnetic wave propagating structure according to the present invention.

As shown in FIG. 30, the seventeenth preferred embodiment of an electromagnetic wave propagating structure according to the present invention differs from the fourteenth preferred embodiment in that the main body is of the seventeenth preferred embodiment is further formed with a plurality of the grooves 13 at the exit side 12s. The grooves 13 are periodically spaced apart from each other, and the distance between each adjacent pair of the grooves 13 is not larger than the wavelength of the electromagnetic wave.

As verified through simulation, effects similar to those disclosed hereinabove are achieved by the seventeenth preferred embodiment, where the electromagnetic wave is focused into a light spot having a size smaller than half of the wavelength of the electromagnetic wave.

Similarly, when the incident side is formed with at least one groove, the physical behavior of the electromagnetic wave coupling into and after propagating through the wave-propagating channels will change. An example is provided hereinbelow.

Figure 31:
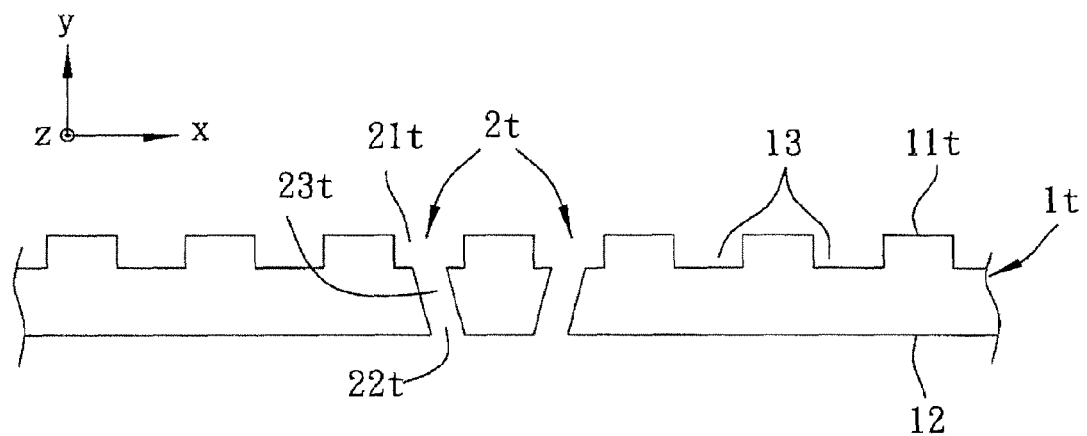
FIG. 31 is a schematic diagram of the eighteenth preferred embodiment of an electromagnetic wave propagating structure according to the present invention.

As shown in FIG. 31, the eighteenth preferred embodiment of an electromagnetic wave propagating structure according to the present invention differs from the fourteenth preferred embodiment in that the main body 1t of the eighteenth preferred embodiment is further formed with a plurality of periodically spaced apart grooves 13 at the incident side 11t. Each of the grooves 13 has an inner dimension that is not larger than half of the wavelength of the electromagnetic wave. In addition, the distance between each adjacent pair of the grooves 13 is not larger than the wavelength of the electromagnetic wave. In this embodiment, two of the grooves 13 are respectively disposed in spatial communication with the wave-propagating channels 2t such that the incident opening 21t of each of the wave-propagating channels 2t at the incident side 11t has an inner dimension not smaller than that of the inner portion 23t of each of the wave-propagating channels 2t between the incident opening 21t and the exit opening 22t.

As verified through simulation, similar to the previous embodiments, the eighteenth preferred embodiment also achieves the effect of focusing of the electromagnetic wave into a light spot having a size smaller than half of the wavelength of the electromagnetic wave.

Figure 32:
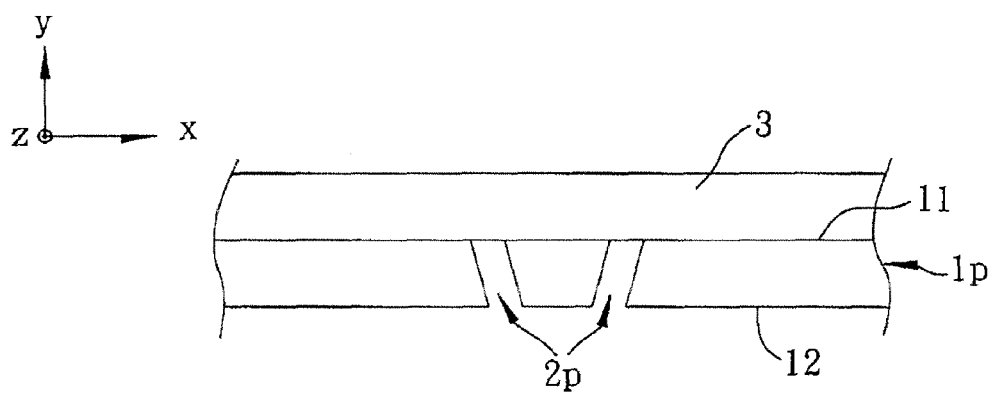
FIG. 32 is a schematic diagram of the nineteenth preferred embodiment of an electromagnetic wave propagating structure according to the present invention.

It should be noted herein that the electromagnetic wave propagating structure of the fourteenth to eighteenth preferred embodiments can also involve the use of a dielectric material. For instance, as shown in FIG. 32, the nineteenth preferred embodiment of an electromagnetic wave propagating structure according to the present invention differs from the fourteenth preferred embodiment in the inclusion of a light-transmissible dielectric layer 3 disposed on the incident side 11 of the main body 1p for supporting the main body 1p, for generating a waveguide effect, and for changing the propagating behavior of the electromagnetic wave that is to be propagated through the electromagnetic wave propagating structure. In this embodiment, the light-transmissible dielectric layer 3 is made from glass.

It was verified through simulation that the nineteenth preferred embodiment also achieves the effect of focusing of the electromagnetic wave into a light spot having a size smaller than half of the wavelength of the electromagnetic wave.

Figure 33:
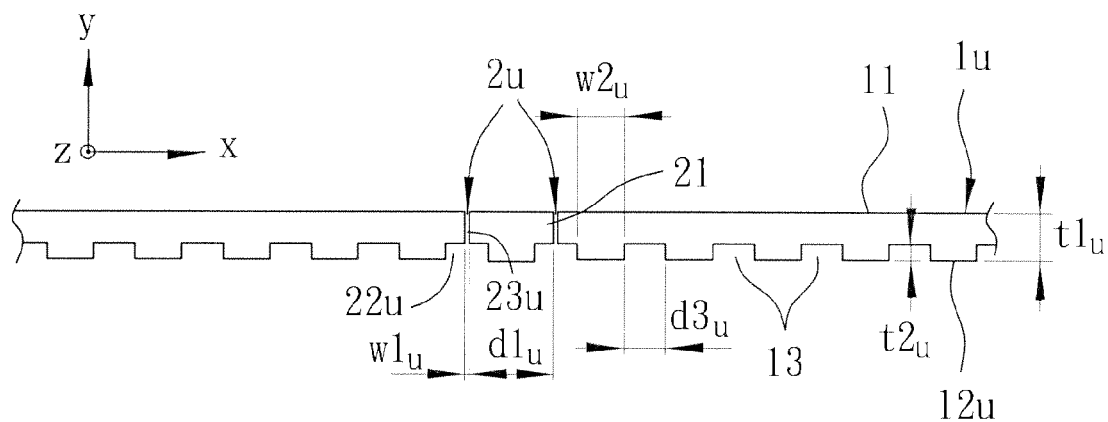
FIG. 33 is a schematic diagram of the twentieth preferred embodiment of an electromagnetic wave propagating structure according to the present invention.

As shown in FIG. 33, the twentieth preferred embodiment of an electromagnetic wave propagating structure according to the present invention differs from the first preferred embodiment in that the main body 1u of the twentieth preferred embodiment is further formed with a plurality of periodically spaced apart grooves 13 at the exit side 12u. Each of the grooves 13 has an inner dimension that is not larger than half of the wavelength of the electromagnetic wave. In addition, the distance between each adjacent pair of the grooves 13 is not larger than the wavelength of the electromagnetic wave. In this embodiment, two of the grooves 13 are respectively disposed in spatial communication with the wave-propagating channels 2u such that the exit opening 22u of each of the wave-propagating channels 2u has an inner dimension that is not smaller than that of the inner portion 23u of the corresponding one of the wave-propagating channels 2u. Furthermore, the inner portion 23u of each of the wave-propagating channels 2u has a central line that is parallel to the central axis of the main body 1u. The central lines are equidistant from the central axis of the main body 1u in the first direction (x). In addition, the exit opening 22u of each of the wave-propagating channels 2u is symmetrical about the central line of the inner portion 23u of the corresponding one of the wave-propagating channels 2u. At least one of the inner dimension and depth of each of the grooves 13 and the distance between adjacent ones of the grooves 13 is set such that after the electromagnetic wave has propagated through the two wave-propagating channels 2u, the fields exiting the two wave-propagating channels 2u are superposed near the central axis of the main body 1u, and continue to propagate along the central axis while the energy distribution remains substantially unchanged during the propagation. In other words, a super-collimated beam is formed, where the angle of divergence is very close to zero.

Likewise, a simulation was conducted for the twentieth preferred embodiment using the finite-difference time-domain (FDTD) method. For the twentieth preferred embodiment, the simulation system has 3000×3000 cells of Yee space lattice with a unit cell length of 4 nm. The origin is located at index ($I_x$, $I_y$)=(1500, 2500). The electromagnetic wave has a wavelength of 633 nm. The main body 1u has a thickness ($t1_u$) of 240 nm (i.e., the incident side 11 and the exit side 12u of the main body 1u are respectively located at ($I_y$=2520) and ($I_y$=2461)). The width ($w1_u$) of each of the wave-propagating channels 2u is 40 nm, and the distance ($d1_u$) between the two wave-propagating channels 2u is 440 nm. Each of the grooves 13 has a depth ($t2_u$) of 80 nm and a width ($w2_u$) of 240 nm. In addition, the distance ($d3_u$) between each adjacent pair of the grooves 13 is 240 nm. Further, the electromagnetic wave source is located at ($I_y$=2900) in the grid system, and the electromagnetic wave propagates in the second direction (y) with decreasing ($I_y$) values. The electric field and magnetic field are polarized respectively in the first and third directions (x), (z), and are normalized as unity. Both boundaries for the first direction (x) of the simulation system at an upper portion of the main body 1u about a center of the main body 1u are periodic so as to minimize numerical reflection and errors, while all other boundaries are set as Perfectly Matched Layer Absorbing Boundary Conditions. The time is normalized to the period of the electromagnetic wave that is to be propagated through the wave propagating channels 2u, and the time step (dt) in the simulation is 0.004.

Figure 34:
FIG. 34 is a magnetic field intensity diagram, illustrating a simulation result of a z-direction magnetic field obtained for the twentieth preferred embodiment.

With further reference to FIG. 34, at time=30.0, after the electromagnetic wave has propagated through the two wave-propagating channels 2u, the z-direction magnetic field ($H_z$) continues to propagate downwardly away from the exit side 12u of the main body 1u as a super-collimated beam with a substantially fixed amplitude for a distance larger than ten times the wavelength of the electromagnetic wave.

Figure 35:
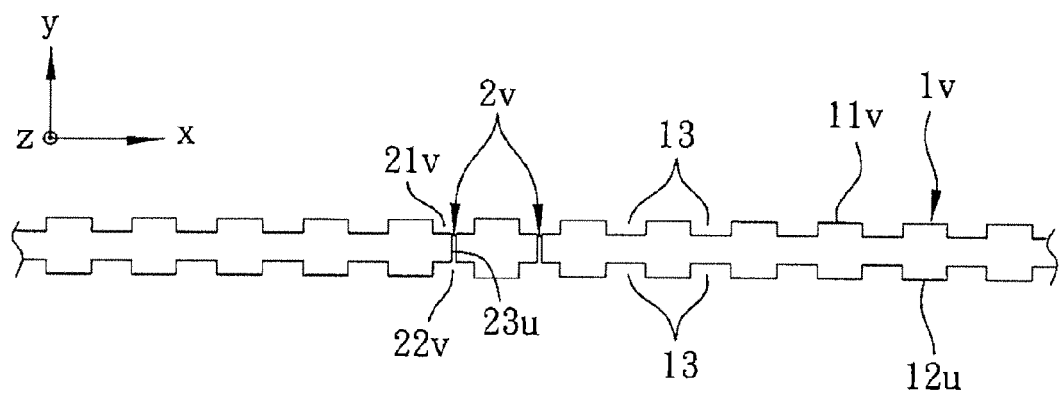
FIG. 35 is a schematic diagram of the twenty-first preferred embodiment of an electromagnetic wave propagating structure according to the present invention.

As shown in FIG. 35, the twenty-first preferred embodiment of an electromagnetic wave propagating structure according to the present invention differs from the twentieth preferred embodiment in that both the incident side 11v and the exit side 12u of the main body 1v are formed with the grooves 13 such that the inner dimensions of both of the incident and exit openings 21v, 22u of each of the wave-propagating channels 2v are not smaller than that of the inner portion 23u of the corresponding one of the wave-propagating channels 2v. In this embodiment, the grooves 13 at the incident side 11v and the grooves 13 at the exit side 12u are symmetrically disposed about a longitudinal axis of the main body 1v in the first direction (x).

As verified through simulation, after propagating through the main body 1v via the wave-propagating channels 2v, the electromagnetic wave continues to propagate downwardly away from the exit side 12u of the main body 1v as a super-collimated beam with substantially fixed amplitude. Furthermore, the intensity of the electromagnetic wave after propagating through the wave-propagating channels 2v of the twenty-first preferred embodiment is greater than that after propagating through the wave-propagating channels 2u of the twentieth preferred embodiment.

Figure 36:
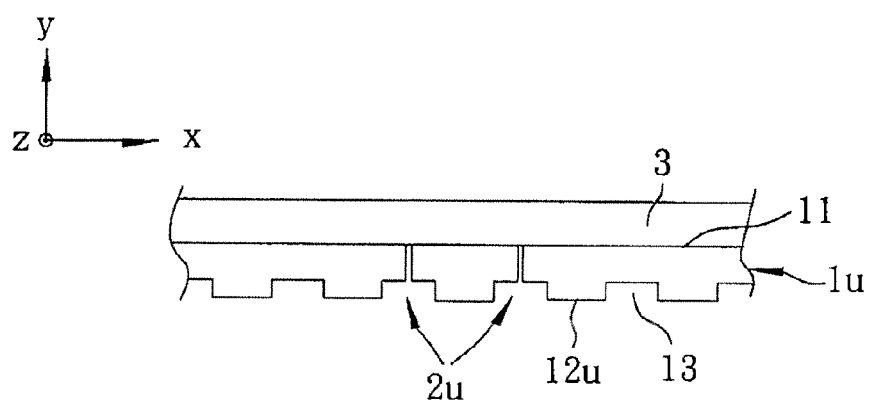
FIG. 36 is a schematic diagram of the twenty-second preferred embodiment of an electromagnetic wave propagating structure according to the present invention.

It should be noted herein that the electromagnetic wave propagating structure of the twentieth and twenty-first preferred embodiments can also involve the use of dielectric materials. For instance, as shown in FIG. 36, the twenty-second preferred embodiment of an electromagnetic wave propagating structure according to the present invention further includes a light-transmissible dielectric layer 3 that is disposed on the incident side 11 of the main body 1u for supporting the main body 1u, for generating the waveguide effect, and for changing the propagating behavior of the electromagnetic wave that is to be propagated through the electromagnetic wave propagating structure. In this embodiment, the light-transmissible dielectric layer is made from glass.

As verified through simulation, effects similar to the twentieth preferred embodiment are achieved by the twenty-second preferred embodiment, where the electromagnetic wave continues to propagate downwardly away from the exit side 12u of the main body 1u while maintaining a fixed amplitude as a super-collimated beam after propagating through the main body 1u via the wave-propagating channels 2u.

It should be noted herein that the dimensions of the incident opening 21, the exit opening 22, and the inner portion 23 of each of the wave-propagating channels 2 are factors that control the divergent angle and the diffraction behavior of the electromagnetic wave that propagates through the wave-propagating channels 2. In addition, the material composing the main body 1, and the presence of the dielectric layers 3 also take part in affecting the intensity variations of the electromagnetic wave during propagation through a system involving the electromagnetic wave propagating structure of the present invention. Therefore, all these factors can be adjusted and defined according to the requirements of a specific application so as to achieve the most desirable results.

Figure 37:
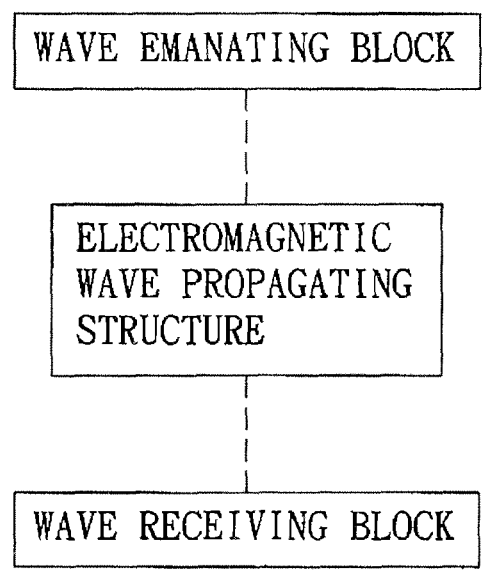
FIG. 37 is a block diagram of an electromagnetic wave propagating system that incorporates the electromagnetic wave propagating structure of this invention.

Referring to FIG. 37, the electromagnetic wave propagating structure of this invention is suitable for application to an electromagnetic wave propagating system that includes a wave emanating block, from which an electromagnetic wave having a wavelength is adapted to propagate in a wave-propagating direction, and a wave receiving block. When the electromagnetic wave propagating structure of the first through nineteenth preferred embodiments is provided between the wave emanating block and the wave receiving block, the electromagnetic wave that propagates from the wave emanating block through the electromagnetic wave propagating structure via the wave-propagating channels toward the wave receiving block is focused into a light spot having a spot size that is smaller than half of the wavelength of the electromagnetic wave. On the other hand, when the electromagnetic wave propagating structure of the twentieth through twenty-second preferred embodiments is provided between the wave emanating block and the wave receiving block, the electromagnetic wave that propagates from the wave emanating block through the electromagnetic wave propagating structure via the wave-propagating channels continues to propagate toward the wave receiving block as a super-collimated beam.

It is apparent to those skilled in the art that the electromagnetic wave propagating structure of the first through nineteenth preferred embodiments can be integrated with the wave emanating block to result in alight spot generator for focusing an electromagnetic wave into a light spot having a spot size that is smaller than half of the wavelength of the electromagnetic wave. Likewise, the electromagnetic wave propagating structure of the twentieth through twenty-second preferred embodiments can be integrated with the wave emanating block to result in alight beam generator for generating a super-collimated beam from an electromagnetic wave.

It can be seen from the above description and simulation results that the electromagnetic wave propagating structure according to the present invention is suitable for various applications, such as in optical, semiconductor, and bio-tech industries. The application of the present invention in lithography processes results in finer, more delicate dots, lines and circuits. Further, the present invention enhances the resolution and precision in optical systems, connects optical systems and electrical circuits, is applicable to sub-wavelength high resolution microscopes in biological and medical imaging industries, is applicable for more precise detection, changes and controls the structure, characteristics and dynamics of biological, chemical and physical systems, generates and reads smaller optical recording spots in optical storage industries, squeezes light into optical circuits having sizes smaller than the wavelength of the light, etc. The super-collimated beam provided by the present invention is suitable for applications requiring an electromagnetic wave beam without divergence during its propagation. In addition, the present invention allows the electromagnetic wave to diverge greatly after being focused, and thus is applicable where an increase of viewing angle is required, e.g., in light-emitting diodes. The subtraction and addition of the sub-wavelength optical fields are applicable in optical computation and control. Moreover, the selectivity for various wavelengths of the electromagnetic wave allows application in filtering.

To summarize, it has been verified through the finite-difference time-domain (FDTD) method that the present invention successfully establishes an electromagnetic wave propagating structure that is adapted to generate a high intensity sub-wavelength focused spot after an electromagnetic wave propagates therethrough, and that has an exit structure that allows the electromagnetic wave to surpass the diffraction limit so as to diminish the size of the focused spot to thereby effectively enhance the resolution and precision of optical systems that incorporate the electromagnetic wave propagating structure of this invention.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An electromagnetic wave propagating structure adapted for use in an electromagnetic wave propagating system that includes a wave emanating block, from which an electromagnetic wave having a wavelength is adapted to propagate in a wave-propagating direction, said electromagnetic wave propagating structure comprising:

a main body that has surfaces configured to block propagation of the electromagnetic wave, and that includes an incident side and an exit side opposite to said incident side in the wave-propagating direction, said main body being formed with a plurality of wave-propagating channels that are spaced apart from each other by a distance not greater than the wavelength of the electromagnetic wave, each of said wave-propagating channels extending from said incident side to said exit side and having an inner dimension not greater than half of the wavelength of the electromagnetic wave; and wherein said main body defines a central axis in the wave-propagating direction, each of said wave-propagating channels having an incident opening at said incident side of said main body, and an exit opening at said exit side of said main body;

wherein said main body is further formed with a plurality of grooves in said exit side, adjacent ones of said grooves being spaced apart from each other by a distance not greater than the wavelength of the electromagnetic wave;

wherein the plurality of grooves includes a first groove formed at a first lateral side of a grouping of exactly two of the plurality of wave-propagating channels, and a second groove formed at a second, opposing lateral side of the grouping of exactly two wave-propagating channels, such that exactly two wave-propagating channels are located between the first groove and the second groove in a lateral direction; and wherein at least one of the inner dimension and depth of each of said grooves and the distance between adjacent ones of said grooves is set such that said electromagnetic wave propagating structure is adapted to allow an electromagnetic wave to propagate from the wave emanating block therethrough via said wave-propagating channels for superimposing near the central axis and for continuing to propagate as a super collimated beam.

2. A method for generating a collimated light beam from an electromagnetic wave that propagates from a wave emanating block in a wave-propagating direction, said method comprising the step of:

providing an electromagnetic wave propagating structure including a main body that has surfaces configured to block propagation of the electromagnetic wave, and that includes an incident side and an exit side opposite to the incident side in the wave-propagating direction, the main body being formed with a plurality of wave-propagating channels that are spaced apart from each other by a distance not greater than the wavelength of the electromagnetic wave, each of the wave-propagating channels extending from the incident side to the exit side and having an inner dimension not greater than half of the wavelength of the electromagnetic wave; and wherein the main body defines a central axis in the wave-propagating direction, each of the wave-propagating channels having an incident opening at the incident side of the main body, and an exit opening at the exit side of the main body; and wherein the main body is further formed with a plurality of grooves in the exit side, adjacent ones of the grooves being spaced apart from each other by a distance not greater than the wavelength of the electromagnetic wave;

wherein the plurality of grooves includes a first groove formed at a first lateral side of a grouping of exactly two of the plurality of wave-propagating channels, and a second groove formed at a second, opposing lateral side of the grouping of exactly two wave-propagating channels, such that exactly two wave-propagating channels are located between the first groove and the second groove in a lateral direction; and wherein at least one of the inner dimension and depth of each of the grooves and the distance between adjacent ones of the grooves is set such that the electromagnetic wave propagating structure allows an electromagnetic wave to propagate from the wave emanating block therethrough via the wave-propagating channels for superimposing near the central axis and for continuing to propagate as a super collimated beam.

3. A light beam generator comprising:

a wave emanating block, from which an electromagnetic wave having a wavelength is adapted to propagate in a wave-propagating direction; and an electromagnetic wave propagating structure including a main body that has surfaces configured to block propagation of the electromagnetic wave, and that includes an incident side and an exit side opposite to said incident side in the wave-propagating direction, said main body being formed with a plurality of wave-propagating channels that are spaced apart from each other by a distance not greater than the wavelength of the electromagnetic wave, each of said wave-propagating channels extending from said incident side to said exit side and having an inner dimension not greater than half of the wavelength of the electromagnetic wave; and wherein said main body of said electromagnetic wave propagating structure defines a central axis in the wave-propagating direction, each of said wave-propagating channels having an incident opening at said incident side of said main body, and an exit opening at said exit side of said main body;

wherein said main body of said electromagnetic wave propagating structure is further formed with a plurality of grooves in said exit side, adjacent ones of said grooves being spaced apart from each other by a distance not greater than the wavelength of the electromagnetic wave;

wherein the plurality of grooves includes a first groove formed at a first lateral side of a grouping of exactly two of the plurality of wave-propagating channels, and a second groove formed at a second, opposing lateral side of the grouping of exactly two wave-propagating channels, such that exactly two wave-propagating channels are located between the first groove and the second groove in a lateral direction; and wherein at least one of the inner dimension and depth of each of said grooves and the distance between adjacent ones of said grooves is set such that said electromagnetic wave propagating structure allows the electromagnetic wave to propagate from said wave emanating block therethrough via said wave-propagating channels for superimposing near the central axis and for continuing to propagate as a super collimated beam.

\* \* \* \* \*